June 28, 1932. H. G. BELL 1,864,792
ORNAMENT
Filed June 17, 1931
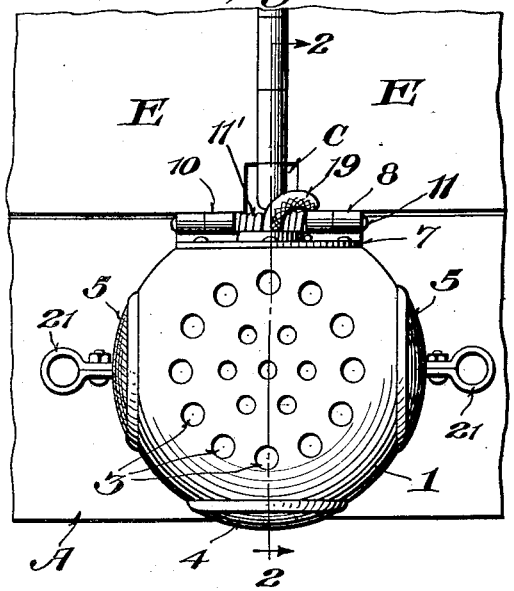
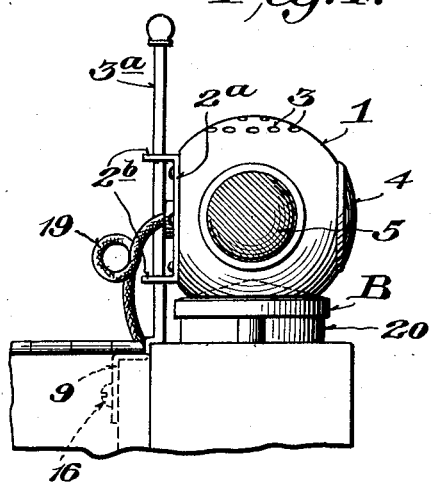
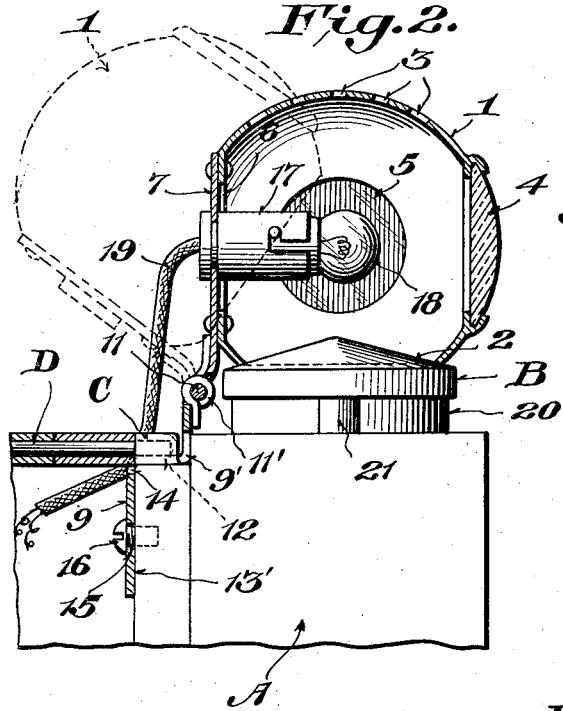
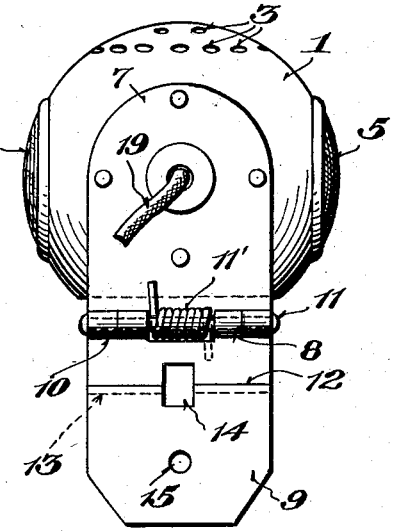
Inventor
Henry G. Bell,
By William T. Geier
Attorney Patented June 28, 1932

1,864,792

UNITED STATES PATENT OFFICE

HENRY GUY BELL, OF BRISBIN, PENNSYLVANIA

ORNAMENT

Application filed June 17, 1931. Serial No. 545,106.

This invention relates to new improvements in ornaments and pertains more particularly to that type of ornament which is applied to automobile radiators.

An important object of this invention is to provide a device of the above character which may be readily attached to an automobile radiator and which is adapted to overlie the usual cap or closure therefor.

Another important object of this invention is to provide a device of the above character which may be readily positioned over the usual radiator closure or filler cap, thus eliminating the necessity in replacing same with a combined ornament and closure as is the present custom.

Another important object of this invention is to provide a device of the above character which may be easily moved to a position to afford ready access to the usual radiator filler cap so that same may be removed when desired.

Another important object of this invention is to provide a device of the above character which may be illuminated so as to afford a visible indicator for night driving, the control for the lighting means being under the control of the operator of the vehicle.

Still another object of this invention is to provide a device of the above character which is of simple construction and one which may be manufactured and placed upon the market at a reasonable cost.

These and other objects will appear throughout the following description and drawing, in which:

Fig. 1 is a plan view of the device attached to an automobile radiator, the latter being broken away;

Fig. 2 is a vertical sectional view taken on line 2—2 of Fig. 1;

Fig. 3 is a rear elevation of the device removed from the radiator; and

Fig. 4 is a side elevation of a modified form of the device, parts broken away, showing another means of supporting same upon the radiator closure.

Referring in detail to the drawing, A designates an automobile radiator having the usual filler cap B mounted therein in any suitable manner. Secured to the radiator in the usual manner is a bearing member C for supporting one end of a rod D which latter hingedly connects two sections E of an engine hood together. The foregoing parts are of usual construction and form no part of the present device except as a support for the latter.

The device forming the present invention consists of a hollow metal casing 1 of substantially spherical formation, formed with an open bottom 2 and with perforations 3 in the top thereof, the purpose of the perforations being hereinafter more fully described. It is to be understood that the casing 1 may be of the shape shown or of any other desired design. The casing 1 is formed with a front sight opening 4 and with substantially diametrically opposite sight openings 5 in the sides thereof. The casing is further formed with a rear plane surface 6 to which is secured by any suitable means, a plate 7 having its lower free edge formed to provide one-half of a hinge connection 8. A plate 9 having its free edge portion 10 formed to provide one-half of a hinge connection is secured to the portion 8 by means of a hinge pintle 11. A coil spring 11' is disposed about the pintle and cooperates with the plates 7 and 9 for yieldingly retaining the casing in position upon the filler cap B. A suitable distance below the edge portion 10 the plate 9 is bent rearwardly as at 9' to form a shoulder 12 and is then bent downwardly as at 13 to form a butt plate 13'. The portion 13' extends parallel to and in substantially the same plane as the upper edge portion 10.

Intermediate the side edges of the plate 9 and extending throughout the shoulder portion 12 and partly into the portions 10 and 13' is a slot 14 adapted, when the plate is mounted in position upon the radiator, to receive the rod bearing C, while spaced from said slot is an opening 15 formed in the depending portion 13' to receive a bolt 16 for securing the entire structure to the radiator A.

The walls defining the slot 14 are adapted to engage the sides of the bearing member C to prevent shifting of the plate when the device is secured in position.

A lamp socket 17 extends through and is secured to the wall 6 and the plate 7 and is adapted to receive a lamp bulb 18 for illuminating the interior of the casing 1. An electrical conduit 19 has one end secured to the socket and leads to any suitable source of current and to a dash board of the vehicle, (not shown).

Secured about the neck portion of the radiator filler opening is a flag staff holder 20 formed with a pair of oppositely disposed eyes 21 each of which is adapted to receive a flag or banner. When the casing is illuminated, light rays are emitted through the side sight openings 5 which may be of a distinctive color, such as red and green, to indicate the left and right sides of the vehicle respectively, and also through the perforations 3 for illuminating the flags carried by the holder 20.

In operation the plate 9 is positioned against the rear wall of the radiator so as to receive the bearings C in the slot 14 and is secured to said wall by means of a bolt 16. The spring 11' normally urges the wall defining the bottom opening 2 into contact with the filler cap B. When it is desired to remove the cap B for filling the radiator the casing 1 is swung about the pintle 11 to the dotted line position thereby permitting the cap B to be removed in the usual manner of filling the radiator. After the cap B has been replaced the casing 1 is released and same assumes the position shown in Figs. 2 and 3 due to the action of the spring 11'. It will thus be seen a simple and novel ornament is provided for automobile radiators having the ordinary type of filler cap and which eliminates the necessity of removing said cap to replace same with an ornament of more complicated construction.

In the modified form of the device disclosed in Fig. 4 the casing 1 is provided with a bracket 2a having rearwardly extending free end portions 2b formed with openings to loosely receive a vertically extending rod 3a carried by the plate 9. This construction provides an ornament for automobile radiator filler caps which may be moved vertically on the rod 3a and then swung about the latter as a pivot to permit the filler cap B to be removed.

Having thus described my invention, what I claim is:

1. An ornament of the character described, adapted for use with an automobile radiator having a filler cap, comprising a plate secured to the rear face of the radiator and extending beyond the upper edge of the latter, an ornament pivotally secured to said plate above the radiator, and means for normally urging said ornament into engagement with the filler cap.

2. In an ornament of the character described, adapted for use with an automobile having a radiator and a sectional hood, a bracket member having one end portion thereof extending beneath the hood and secured to the rear wall of the radiator and having its opposite end terminating above the hood and radiator, an ornament movably mounted upon the upper end of the bracket, and means for normally urging said ornament into contact with the radiator.

3. An ornament of the character described adapted for use with an automobile radiator filler cap, comprising a support having one end secured to the rear face of the radiator and having its opposite free end terminating above the upper surface of the latter, an ornament pivotally secured to the free end of the support, and means for normally urging said ornament into yielding engagement with the filler cap, whereby said ornament may be moved out of the path of the filler cap to permit ready removal of the latter.

4. In combination with an automobile radiator and filler cap therefor, an elongated supporting plate having its lower end secured to the rear face of the radiator and its upper end terminating above the latter, an illuminated casing pivotally secured to the upper end of the plate and overlying the filler cap, and means for illuminating said casing, said casing being independently movable out of the path of said filler cap whereby to permit ready access to and removal of the latter.

5. In combination with an automobile radiator and filler cap therefor, an elongated supporting plate having its lower end secured to the rear face of the radiator and its upper end terminating above the latter, said plate having a shoulder formed intermediate its ends and engaging the upper surface of the radiator, an illuminated casing pivotally secured to the upper end of the plate and overlying the filler cap, and means for illuminating said casing, said casing being independently movable out of the path of said filler cap whereby to permit ready access to and removal of the latter.

6. In an ornament of the character described for use with an automobile having a radiator filler cap, a sectional hood and a supporting rod for the latter, a bracket member having one of its ends extending beneath the hood and secured to the rear wall of the radiator and having its opposite end terminating above the radiator, said bracket member having an opening intermediate its ends to receive the hood supporting rod to prevent lateral movement of said bracket, an ornament movably mounted upon the upper end of the bracket, and yieldable means for normally urging said ornament into engagement with said filler cap.

7. In an ornament of the character described for use with an automobile having a radiator filler cap, a sectional hood and a supporting rod for the latter, a bracket member having one end thereof extending beneath the hood and secured to the rear wall of the radiator and having its opposite end terminating above the radiator, a shoulder formed intermediate the ends of the bracket adapted to seat upon the upper surface of the radiator, said shoulder being formed with an opening to receive the hood supporting rod to prevent lateral movement of said bracket, an ornament movably mounted upon the upper end of the bracket, and yieldable means for normally urging said ornament into engagement with said filler cap.

In testimony whereof I affix my signature.

HENRY GUY BELL.